United States Patent [19]

Miaskoff

[11] 4,031,793
[45] June 28, 1977

[54] BAND KNIFE TOOTH SHAPE

[75] Inventor: Leonard Miaskoff, Easton, Pa.

[73] Assignee: Harris Corporation, Cleveland, Ohio

[22] Filed: May 3, 1976

[21] Appl. No.: 682,624

[52] U.S. Cl. .............................. 83/788; 83/435.2; 83/661

[51] Int. Cl.² ................... B26D 1/46; B23D 61/12; B27B 33/06

[58] Field of Search ................. 83/661, 835, 435.2, 83/788

[56] References Cited

UNITED STATES PATENTS

| 286,706 | 10/1883 | Kay | 83/661 |
|---|---|---|---|
| 2,852,052 | 9/1958 | Hansen | 83/661 |
| 3,208,321 | 9/1965 | Holt | 83/435.2 |
| 3,889,564 | 6/1975 | Aspinwall et al. | 83/820 |

*Primary Examiner*—Donald R. Schran

[57] ABSTRACT

A cutting blade for use in paper trimming machines and the like. A beveled surface is included which tapers the first side of the blade toward a second side so as to form an acute angle at the intersection of the second side and the beveled surface. The blade is regularly scalloped along the second side so that the scallops form an acute angle with the beveled surface. The generally serrated cutting edge so formed lies entirely within the plane of the beveled surface. During the cutting operation, the blade is inclined to the cutting plane so that the cutting plane and the plane of the beveled surface are substantially coincident. With the blade thus disposed, the cutting edges all lie within the cutting plane. Tearing and crushing of the paper is thus substantially avoided. The cutting edge so formed can be sharpened without significantly changing the shape of the cutting edge by grinding the beveled surface.

2 Claims, 6 Drawing Figures

BAND KNIFE TOOTH SHAPE

FIELD AND BACKGROUND OF THE INVENTION

The present invention relates to the art of cutting and trimming devices and more particularly to paper trimming machines employing sawing-type cutting actions.

Conventional paper trimming machines generally use guillotine-type blades driven at substantially perpendicular angles to the material being cut so as to shear the material along the desired line. Because of the extreme angle at which the cutting edge is driven with respect to the work material, substantial force must be imparted to the blade to complete the cutting action. These devices provide clean and even cuts, but are usually quite large and bulky. Also, these machines are inappropriate for many uses because of the limited amount of material which can be cut with a single stroke of the cutting blade.

Sawing-type cutting actions are preferable in these applications because the cutting action is continuous and may proceed substantially without interruption. An additional advantage of such machines lies in the size and weight reductions which may be realized over the previously described, guillotine-type machines. These devices, typically band saw machines, have met with difficulties, however, due to the tendency of the cutting edge to tear and crush the material being severed. An example of this type of trimming device is described in U.S. Pat. No. 1,635,165.

It is, of course, economically desirable to have a band saw blade which may be resharpened. This is commonly difficult because of the complex shape of the cutting edges used. Also, resharpening of the blades characteristically causes changes in the shape of the cutting edge and a resultant diminution in quality of the cut provided thereby.

SUMMARY OF THE INVENTION

The present invention provides a paper trimming machine having a cutting blade with a novel tooth shape, and overcomes many of the difficulties of the prior art. The cutting edge of the blade lies entirely within the cutting plane, thereby minimizing tearing and crushing of the work materials. Additionally, the blade may be easily sharpened by grinding a single plane. Since resharpening does not significantly change the shape of the cutting edge, high quality cutting action is maintained substantially throughout the life of the blade.

The tooth shape disclosed includes a cutting edge formed by beveling one side of the blade toward the other side such that the beveled surface forms an obtuse angle with the first side and an acute angle with the second side. The cutting edge so formed is provided with a generally serrated profile by scalloping the edge such that the scallops form an obtuse angle with the second side and an acute angle with the beveled surface. When so constructed, the cutting edge lies entirely within the plane of the beveled surface.

In use, the blade is disposed at an angle to the surface of the work material whereby the beveled surface lies entirely within the cutting plane so that all of the cutting edge similarly lies within the cutting plane.

Resharpening of the blade can be accomplished easily and economically be grinding the beveled surface. Such grinding does not significantly alter the shape of the cutting edge nor impair the quality of the cut provided thereby.

BRIEF DESCRIPTON OF THE DRAWINGS

The foregoing and other aspects and advantages of the present invention will become more readily apparent from the following description of the preferred embodiments as taken in conjunction with the accompanying drawings which are a part hereof and wherein.

DETAILED DESCRIPTION

The present invention will first be described generally with reference to FIGS. 1 through 3. A knife blade 10 is shown having a cutting edge formed by the intersection of scallops 14 with a beveled surface 16.

Figure 3:
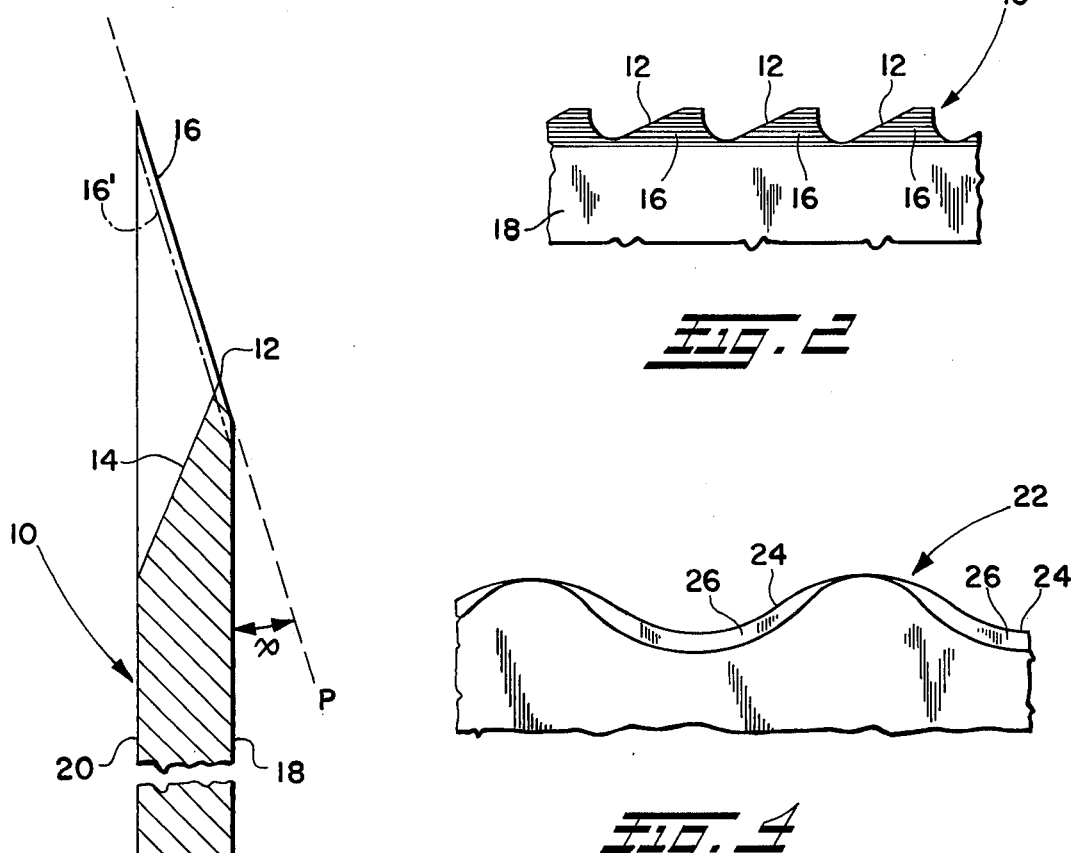
FIG. 3 is an enlarged vertical cross-sectional taken along the line 3—3 of FIG. 1.

Referring specifically to FIG. 3, it will be seen that the beveled surface is directed from a first side 18 to a second side 20 such that the beveled surface forms an obtuse angle with first side 18 and an acute angle with second side 20. The scalloped portion 14, on the otherhand, is directed from second side 20 back to first side 18. The scalloped portion thus forms an obtuse angle with second side 20 and an acute angle with the beveled portion 16. When so structured, it will be seen that all of the cutting edges 12 lie in a plane P shown in FIG. 3. This plane is, of course, the same plane in which beveled surface 16 lies. Also, it will be appreciated that beveled surface 16 may be ground to expose a second cutting surface 16'. It will be readily apparent from an examination of FIG. 3 that cutting surface 16' will have a cutting edge bearing substantially the same shape as cutting edge 12. Also, the cutting surface again lies entirely within a single plane. Because of this, the cutting edge may be continuously resharpened, the only detriment being that the depth of the serrations in cutting edge 12 will be diminished as the size of scallop 14 is further reduced through subsequent grinding.

During the cutting operation, cutting blade 10 should be positioned so that the plane of the bevel coincides with the plane along which the cutting occurs. When so disposed, all of the cutting edges will lie within the cutting plane, thereby substantially reducing tearing and crushing of the work material.

The shape of cutting edge 12 is determined by the shape of the scallops removed from the cutting blade. Further, it will be understood that the purposes of the present invention will be equally served by one shape of cutting edge 12 as by another. The present invention is not limited to a particular shape of cutting edge.

Figure 4:
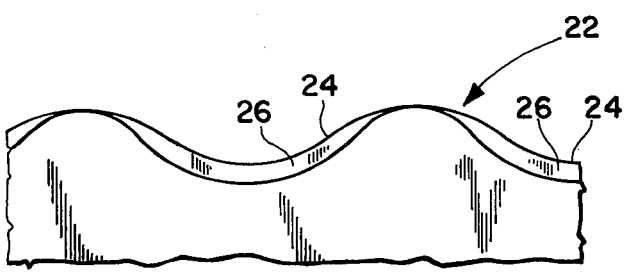
FIG. 4 is a front elevational view of an alternate blade shape in accordance with the teachings of the present invention.

Referring now to specifically to FIG. 4, a second blade 22 is shown having a smoothly rounded cutting edge 24. Cutting edge 24 is formed by removing uniform, symmetrical scallops 26 from the cutting blade 22.

Figure 5:
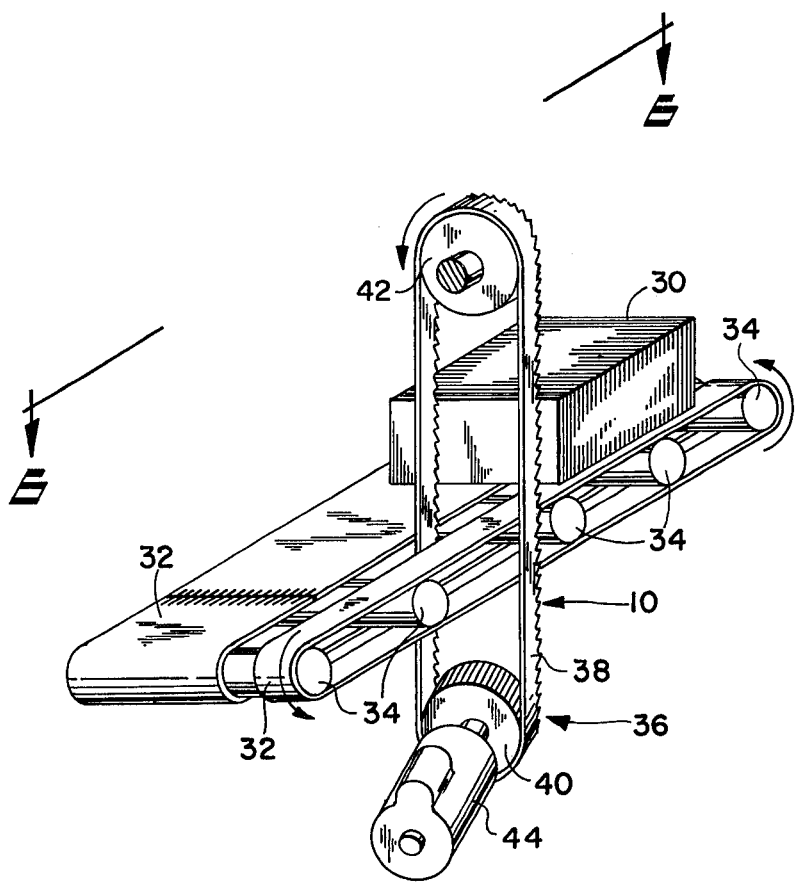
FIG. 5 is a simplified perspective drawing of a paper trimming machine in accordance with the present invention.
Figure 6:
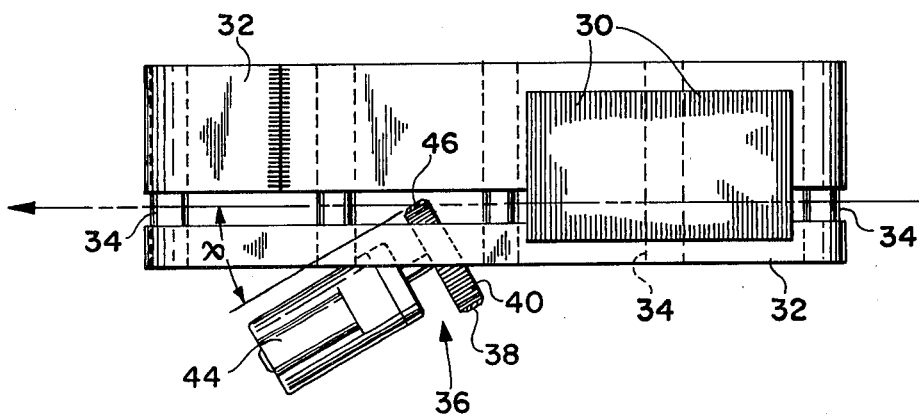
FIG. 6 is an elevational topside view of the paper cutting machine of FIG. 5.

FIGS. 5 and 6 illustrate a trimming machine employing the blade shapes described. This trimming machine may take the form, for example, of the trimming device described in U.S. Pat. No. 1,635,165. The material being trimmed 30 is restrained to move along a conveyor belt 32 which is continuous and is drivingly engaged by a plurality of rollers 34. Rollers 34 are driven by a motor (not shown) so as to drive material 30 past a cutting station 36. Cutting station 36 includes a band saw blade 38 disposed about two pulleys 40 and 42. Pulley 40 is driven by motor 44 so as drive band saw blade 38 transversely past material 30.

Figure 1:
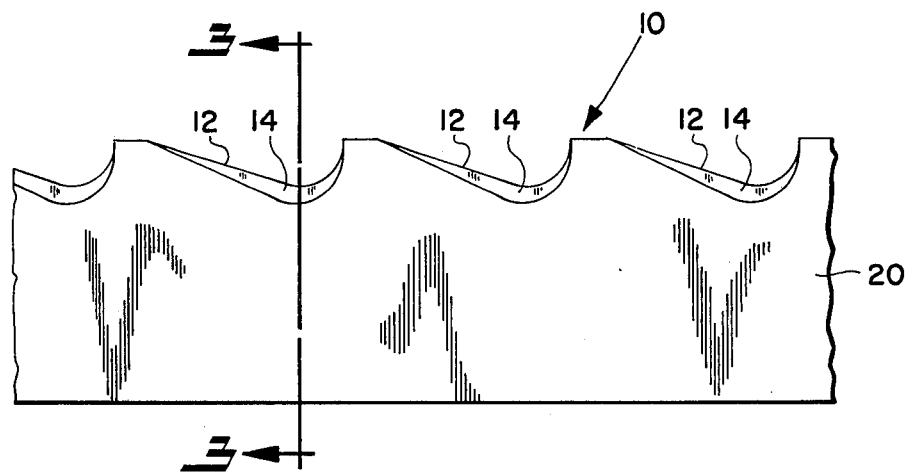
FIG. 1 is a front elevational view of a segment of the blade made in accordance with the teachings of the present invention, looking at the scalloped portions.
Figure 2:
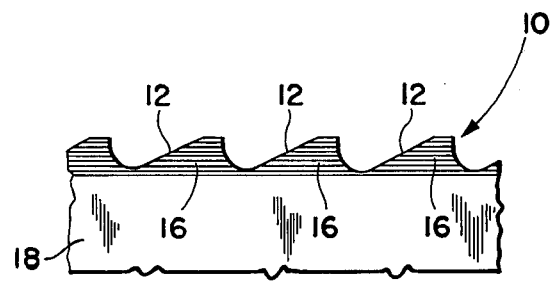
FIG. 2 is a rear elevational view thereof, looking at the beveled surface.

In accordance with the present invention, cutting blade 38 is constructed with the tooth shape shown in FIGS. 1 and 3 and is obliquely disposed with respect to the cutting plane P. This inclination is scaled such that the beveled surface 16 of blade 38 lies substantially within plane P. The cutting edges, thus, all lie within the cutting plane. Additionally, it will be seen that this disposition of cutting blade 38 prevents the first side 46 of blade 38 from rubbing against work material 30, thus preventing the bunching of work material 30 generally associated therewith.

Although the invention has been described with respect to a preferred embodiment, it will be understood that various alternations and arrangements of parts may be made without departing from the spirit and scope of the invention as disclosed herein.

I claim:
1. Apparatus for cutting sheet material comprising a cutting blade, first means for longitudinally moving said cutting blade across workpiece so as to produce a cutting action, and second means for transversely moving said blade and said workpiece relative to one another so as to sever said workpiece along a cutting plane, and wherein said cutting blade has substantially parallel first and second sides, a back edge and a cuttting edge, said cutting edge being formed along a beveled surface being inclined with respect to said sides so as to join said first side at an obtuse angle and said second side at an acute angle, said beveled surface being generally serrated by scallops disposed at an acute angle to said beveled surface and an obtuse angle to said second side such that the cutting edge formed at the intersection of said beveled surface with said scallops lies entirely within the plane of said beveled surface, said second means for transversely moving said blade and said workpiece relative to one another being adapted to move said blade and said workpiece so that said cutting plane including said serrated cutting edge is substantially coincident with said beveled surface.

2. Apparatus as set forth in claim 1 wherein said cutting blade is formed into a continuous band, said band being engaged about a plurality of pulleys, and wherein said first means comprises means for rotating at least one of said pulleys so as to rotate said cutting blade about said pulleys.

* * * * *